(12) United States Patent
Mathias

(10) Patent No.: US 6,468,083 B1
(45) Date of Patent: Oct. 22, 2002

US006468083B1

(54) GLOBAL COMMUNICATION MEANS

(76) Inventor: Joseph Mathias, 1909 Effingham St., Ridgeville, Ontario (CA), L0S 1M0

( * ) Notice: Subject to any disclaimer, the term of this patent is extended or adjusted under 35 U.S.C. 154(b) by 116 days.

(21) Appl. No.: 09/672,091

(22) Filed: Sep. 29, 2000

(51) Int. Cl.[7] .......................... G09B 19/00; G09B 17/00
(52) U.S. Cl. .................... 434/167; 434/156; 434/178
(58) Field of Search ................. 434/156, 159, 434/167, 178

(56) References Cited

U.S. PATENT DOCUMENTS

| | | | |
|---|---|---|---|
| 4,007,548 A | * 2/1977 | Cytanovich | 434/178 |
| 4,193,212 A | 3/1980 | Al-Kufaishi | 434/178 |
| 4,315,482 A | 2/1982 | Cooper | 119/712 |
| 4,609,357 A | * 9/1986 | Clegg | 434/167 |
| 4,655,713 A | 4/1987 | Weiss | 434/176 |
| 4,684,348 A | * 8/1987 | Raynor | 434/156 |
| 4,713,008 A | 12/1987 | Stocker et al. | 434/167 |
| 4,768,959 A | 9/1988 | Sprague et al. | 434/156 |
| 5,360,343 A | * 11/1994 | Tang | 434/118 |
| 6,009,397 A | * 12/1999 | Siegel | 704/270 |
| 6,077,080 A | * 6/2000 | Rai | 434/170 |
| 6,126,447 A | * 10/2000 | Engelbrite | 434/167 |

* cited by examiner

Primary Examiner—Derris H. Banks
Assistant Examiner—Kurt Fernstrom

(57) ABSTRACT

A communication means including a global phonetic alphabet consisting of the 31 symbols wherein said alphabet symbols are used to form a computer operating language consisting of the global phonetic alphabet symbols. Preferably said symbols are arranged together to form words wherein each word so formed has only one distinct meaning and one distinct sound. Preferably said words compiled together form a global phonetic language. Preferably said language is adapted for including voice recognition software for communicating orally with computers

3 Claims, 2 Drawing Sheets

Numbers & Letters for a Global Phonetic Alphabet

| English Numbers | Alphabet | Phonetic caps & sml | Sounds as in: | The simple letters are: |
|---|---|---|---|---|
| 0 | zero, naught | 0   o | on, pond, common, solid | a circle |
| 1 | one, (won) | 1   1 | up, won, the, tub, under | verticle line |
| 2 | two, (too) | 2   2 | ooze, true, shoe, new, sue | right half circle on a line |
| 3 | three | 3   3 | eat, eel, she, piece, baby | two small half circles |
| 4 | four, (dor) | ∧   ∧ | old, show, shoal, know | up arrow |
| 5 | five | ⊃   ⊃ | ice, live, buy, sigh, try | right half circle |
| 6 | six | 6   6 | it, sit, pretty, city | left half & small circle |
| 7 | seven | 7   7 | end, bet, sweat, severel | top right angle |
| 8 | eight | ∪   ∪ | ate, straight, freight | bottom half circle |
| 9 | nine, (nan) | 9   9 | at, laugh, banana | small circle on right half |
| 10 | ten | 10  10 | book, bull, would, full | one & zero |
| 11 | B       b | b   b | bat, babble | line & half circle |
| 12 | C       c | c   c | child, itch, church | left half circle |
| 13 | D       d | D   D | day, daddy | line & right half circle |
| 14 | F       f | r   r | find, photo, graph | line with half circle top |
| 15 | G       g | \   \ | go, ago, stag | downward sloping slash |

FIGURE 1

Numbers & Letters for a Global Phonetic Alphabet

| English Numbers | Alphabet | Phonetic caps & sml | | Sounds as in: | The simple letters are: |
|---|---|---|---|---|---|
| 0 | zero, naught | 0 | ɑ | on, pond, common, solid | a circle |
| 1 | one, (won) | 1 | 1 | up, won, the, tub, under | verticle line |
| 2 | two, (too) | 2 | 2 | ooze, true, shoe, new, sue | right half circle on a line |
| 3 | three | 3 | 3 | eat, eel, she, piece, baby | two small half circles |
| 4 | four, (dor) | ∧ | ∧ | old, show, shoal, know | up arrow |
| 5 | five | ⊃ | ⊃ | ice, live, buy, sigh, try | right half circle |
| 6 | six | 6 | 6 | It, sit, pretty, city | left half & small circle |
| 7 | seven | 7 | 7 | end, bet, sweat, severel | top right angle |
| 8 | eight | ∪ | ∪ | ate, straight, freight | bottom half circle |
| 9 | nine, (nan) | 9 | 9 | at, laugh, banana | small circle on right half |
| 10 | ten | 10 | 10 | book, bull, would, full | one & zero |
| 11 | B    b | b | b | bat, babble | line & half circle |
| 12 | C    c | c | c | child, itch, church | left half circle |
| 13 | D    d | D | D | day, daddy | line & right half circle |
| 14 | F    f | r | r | find, photo, graph | line with half circle top |
| 15 | G    g | \ | \ | go, ago, stag | downward sloping slash |

FIGURE 2

Numbers & Letters for a Global Phonetic Alphabet Continued

| 16 | H | h | h | h | hat, perhaps, | line left of half circle |
|---|---|---|---|---|---|---|
| 17 | J | J | J | J | job, page, strange | line with half circle bottom |
| 18 | K | K | < | < | cat, kill, stick | left arrow |
| 19 | L | l | L | L | low, willow, ill | left angle bottom |
| 20 | M | m | - | - | me, mam, stammer | horizontal dash |
| 21 | N | n | n | n | no, dinner, din | small top half of a circle |
| 22 | P | P | P | P | pin, people, pop | line with half circle top right |
| 23 | R | r | > | > | run, rare, enter | right arrow |
| 24 | S | s | S | S | sin, boss, gas | two half circles opposite |
| 25 | T | t | + | + | toe, at, winter | plus sign or cross |
| 26 | V | v | V | V | vine, vivid, pave | down arrow |
| 27 | W | w | W | W | watt, twin, willow | two bottom half circles |
| 28 | X | x | X | X | extra, fox, axe | two angled crossed lines |
| 29 | Y | y | / | / | you, beyond, oninion | angled line, divide sign |
| 30 | Z | z | Z | Z | zoo, booze | zig-zag line |

GLOBAL COMMUNICATION MEANS

FIELD OF THE INVENTION

The present invention relates to a communication means including phonetic alphabetic symbols and in particular relates to a set of alphabetic symbols which can be used as a global phonetic alphabet.

BACKGROUND OF THE INVENTION

The current alphabet which consists of 26 letters and in addition to that 10 numerals for the numbers a total of 36 different characters for written and oral communication in the English Language. In addition to this many of the letters and vowels currently found in the English Alphabet, represent more than one sound depending upon the word in which the character is found in. Furthermore, depending upon the word being used some characters found within words can have no sound whatsoever, in other words they are silent letters. There are many irregularities in spelling in regard to pronunciations wherein the exact same spelling can have different sounding depending upon the letters that are associated with a particular neighbouring letter in a word. All this results in a very confusing and difficult language to learn to write and to speak and potentially can result in confusion between parties wanting to correspond clearly and decisively a particular meaning.

The indecisiveness and vagueness of the English Alphabet and language associated with it, furthermore can create indefiniteness particularly when computers are communicating and this especially can cause problems for voice recognition softwares which are currently becoming more and more popular in their use.

Presently, often the same words have many different meanings which can cause mistakes to be made in oral and written language and also mistakes to be made in machine language, for example, when users communicate with computers or when computers communicate with each other. A absolute global phonetic alphabet for example having only one meaning for each word and wherein each letter of the alphabet represents only one sound would make more accurate words and there meaning would improve communication both written orally and through computers.

An absolute global phonetic alphabet which is used for a computer operating system will ensure compatibility in the ability for all computers on this earth to be able to communicate with each other accurately and efficiently.

Computers now use a number of different languages and operating systems to activate thousands of other programs that perform various tasks. None of these operating systems are absolute or global in nature which causes mistakes and computer crashes to occur. Currently programs often need to be translated from one system to another which causes further mistakes and slow downs. An absolute global phonetic alphabet will help prevent such mistakes, speed up computer processing and speed up the time of any translations which may be necessary.

An absolute global phonetic alphabet will allow for people, computers, machines, professionals and governments around the world to understand each other and will help eliminate conflicts and errors in communication.

Computers in particular would be more useful with the global phonetic alphabet since they would be able to respond more accurately and more quickly to oral commands and voice recognition software would be much simpler to develop and become more accurate and faster.

Therefore there is a need to provide a universal global phonetic alphabet that facilitates communication between persons of various backgrounds and also facilitates communication between computers and also enables new technologies to be more quickly introduced.

SUMMARY OF THE INVENTION

A communication means including a global phonetic alphabet consisting of the symbols shown in FIG. 1.

Preferably wherein said alphabet symbols are used to form a computer operating language consisting of the global phonetic alphabet symbols.

Preferably wherein said symbols are arranged together to form words wherein each word so formed has only one distinct meaning and one distinct sound.

Preferably wherein said words compiled together form a global phonetic language.

Preferably said language is adapted for including voice recognition software for communicating orally with computers Preferably wherein said alphabet, and words, and language created from said alphabet; are used for communications between people, computers and machines, and by voice, writing, and keyboard, and by cable, wireless, and phone.

BRIEF DESCRIPTION OF THE DRAWINGS

FIG. 1 lists the complete numbers and letters for a global phonetic alphabet as presented in this application. The following set of alphabet symbols are proposed for a global phonetic alphabet which has 11 vowels which can also be used for the first eleven numerals and in total 31 symbols creating the total phonetic alphabet.

FIG. 2 the continuation of the list of the complete numbers and letters for a Global Phonetic Alphabet as presented in this application. The following set of alphabet symbols are proposed for a Global Phonetic Alphabet which has eleven vowels which are to be used for the first eleven numerals and in total 31 symbols creating the total phonetic alphabet.

DETAILED DESCRIPTION OF THE PREFERRED EMBODIMENT

Referring to FIG. 1 the following is a listing of the alphabetical symbols for a global phonetic alphabet. The first eleven symbols represent diphthongs or vowels sounds and the balance represent consonant symbols. Each symbol has a distinctive unaltering sound in and of themselves, and furthermore the sound of each symbol is independent of any surrounding letters.

1. The first symbol being a simple circle; 0 0, which represents the sounds as found in the words; on, pond, common, solid. This symbol may also represent the number 0.
2. The second alphabetical symbol which is a vertical line; 1 1, which represents the sounds as found in the words; up, won, the, tub, under. This symbol may also represent the number 1.
3. The third alphabetical symbol which is a right half circle on a line; 2 2, which represent the sounds found in the words; ooze, true, shoe, new, sue. This symbol may also represent the number 2.
4. The fourth alphabetical symbol which is two small half circles; 3 3, which represents the sounds found in the words; eat, eel, she, piece, baby. This symbol may also represent the number 3.

5. The fifth alphabetical symbol which is an up arrow; Λ Λ, which represents the sounds found in the words; old, show, shoal, know. This symbol may also represent the number 4.
6. The sixth alphabetical symbol which is a right half circle; ⊃ ⊃, which represents the sounds found in the words; ice, live, buy, sigh, try. This symbol may also represent the number 5.
7. The seventh alphabetical symbol which is a left half & small circle; 6 6, which represents the sounds found in the words; It, sit, pretty, city. This symbol may also represent the number 6.
8. The eight alphabetical symbol which is a top right angle; 7 7, which represents the sounds found in the words; end, bet, sweat, several. This symbol may also represent the number 7.
9. The ninth alphabetical symbol which is a bottom half circle; ∪ ∪, which represents the sounds found in the words; ate, straight, freight. This symbol may also represent the number 8.
10. The tenth alphabetical symbol which is a small circle on right half; 9 9, which represents the sounds found in the words; at, laugh, banana. This symbol may also represent the number 9.
11. The eleventh alphabetical symbol which is a one & zero; 10 10, which represents the sounds found in the words; book, bull, would, full. This symbol may also represent the number 10.
12. The twelfth alphabetical symbol which is a line & half circle; b b, which represents the sounds found in the words; bat, babble.
13. The thirteenth alphabetical symbol which is a left half circle; c c, which represents the sounds found in the words; child, itch, church.
14. The fourteenth alphabetical symbol which is line & right half circle; D D, which represents the sounds found in the words; day, daddy.
15. The fifteenth alphabetical symbol which is a line with half circle top; r r, which represents the sounds found in the words; find, photo, graph.
16. The sixteenth alphabetical symbol which is a downward sloping slash; \ \, which represents the sounds found in the words; go, ago, stag.
17. The seventeenth alphabetical symbol which is a line left of half circle; h h, which represents the sounds found in the words; hat, perhaps.
18. The eighteenth alphabetical symbol which is a line with half circle bottom; J J, which represents the sounds found in the words; job, page, strange.
19. The nineteenth alphabetical symbol which is a left arrow; < <, which represents the sounds found in the words; cat, kill, stick.
20. The twentieth alphabetical symbol which is a left angle bottom; L L, which represents the sounds found in the words; low, willow, ill.
21. The twenty-first alphabetical symbol which is a horizontal dash; - -, which represents the sounds found in the words; me, mam, stammer.
22. The twenty-second alphabetical symbol which is a small top half of a circle; n n, which represents the sounds found in the words; no, dinner, din.
23. The twenty-third alphabetical symbol which is a line with half circle top right; P P, which represents the sounds found in the words; pin, people, pop.
24. The twenty-fourth alphabetical symbol which is a right arrow; > >, which represents the sounds found in the words; run, rare, enter.
25. The twenty-fifth alphabetical symbol which is two half circles opposite; S S, which represents the sounds found in the words; sin, boss, gas.
26. The twenty-sixth alphabetical symbol which is a plus sign or cross; + +, which represents the sounds found in the words; toe, at, winter.
27. The twenty-seventh alphabetical symbol which is a down arrow; V V, which represents the sounds found in the words; vine, vivid, pave.
28. The twenty-eight alphabetical symbol which is two bottom half circles, W W, which represents the sounds found in the words; watt, twin, willow.
29. The twenty-ninth alphabetical symbol which is two angled crossed lines; X X, which represents the sounds found in the words; extra, fox, axe.
30. The thirtieth alphabetical symbol which is an angled line, divided sign; / /, which represents the sounds found in the words; you, beyond, opinion.
31. The thirty-first alphabetical symbol which is a zig-zag line; Z Z, which represents the sounds found in the word; zoo, booze.

Each alphabetical symbol is constructed of simple shapes such as straight lines, angled lines, circles, half circles and combinations of these oriented in various directions. This facilitates the simple reproduction of the symbols both by hand and by machines.

In addition the above defined alphabet symbols can be used for the formulation of a universal computer operating language and a universal written and spoken language. Using the above symbols most English words can be translated into a new word constructed from the global phonetic alphabet.

A language created using the global phonetic alphabet is especially useful for voice recognition software application since every sound has only one distinct symbol.

It should be apparent to persons skilled in the arts that various modifications and adaptation of this structure described above are possible without departure from the spirit of the invention the scope of which defined in the appended claim.

I claim:

1. A global communication means including a global phonetic alphabet consisting of the following symbols:
   a) the first symbol being a simple circle; 0, which represents the short "o" sound or the number 0;
   b) the second symbol which is the roman number one; 1, which represents the "uh" sound or the number 1;
   c) the third symbol which is the roman number two; 2, which represent the "oo" sound or the number 2;
   d) the fourth symbol which is the roman number three; 3, which represents the long "ee" sound or the number 3;
   e) the fifth symbol which is an up arrow; Λ, which represents the long "o" sound or the number 4;
   f) the sixth symbol which is a right half circle; ⊃, which represents the long "i" sound or the number 5;
   g) the seventh symbol which is the roman number six; 6, which represents the short "i" sound or the number 6;
   h) the eight symbol which is the roman number seven; 7, which represents the "eh" sound or the number 7;
   I) the ninth symbol which is a bottom half circle; ∪, which represents the long "a" sound or the number 8;
   j) the tenth symbol which is the roman number nine; 9, which represents the short "a" sound or the number 9;
   k) the eleventh symbol which is the roman number ten; 10, which represents the "uh" sound or the number 10;

l) the twelfth symbol which is the roman letter; b, which represents the "ba" sound.

m) the thirteenth symbol which is the roman letter; c, which represents the "cha" sound.

n) the fourteenth symbol which is the roman letter; D, which represents the "da" sound;

o) the fifteenth symbol which is the roman letter; r, which represents the "pha" sound.

p) the sixteenth symbol which is a downward sloping slash; \, which represents the "ga" sound;

q) the seventeenth symbol which is the roman letter; h, which represents the "ha" sound;

r) the eighteenth symbol which is the roman letter; J, which represents the "ja" sound;

s) the nineteenth symbol which is a left arrow; <, which represents the "ka" sound;

t) the twentieth symbol which is the roman letter; L, which represents the "la" sound;

u) the twenty-first symbol which is a horizontal dash; -, which represents the "mm" sound;

v) the twenty-second symbol which is the roman letter; n, which represents the "nn" sound;

w) the twenty-third symbol which is the roman letter; P, which represents the "pu" sound;

x) the twenty-fourth symbol which is a right arrow; >, which represents the "rr" sound;

y) the twenty-fifth symbol which is the roman letter; S, which represents the "ss" sound;

z) the twenty-six symbol which is a plus sign or cross; +, which represents the "ta" sound;

aa) the twenty-seventh symbol which is the roman letter; V, which represents the "vee" sound, bb) the twenty-eight symbol which is the roman letter; W, which represents the "wub" sound;

cc) the twenty-ninth symbol which is the roman letter; X, which represents the "ex" sound;

dd) the thirtieth symbol which is an angled line or divided sign; /, which represents the "ya" sound;

ee) the thirty-first symbol which is the roman letter; Z, which represents the "za" sound;

Whereby each symbol is presented in bold face and larger font to represent capitalization.

2. The communication means claimed in claim 1 wherein said symbols are arranged together to form words wherein each word so formed has only one distinct meaning and one distinct sound.

3. The communication means claimed in claim 2 wherein said words compiled together form a global phonetic language.

\* \* \* \* \*